(12) United States Patent
Poore et al.

(10) Patent No.: US 8,978,023 B2
(45) Date of Patent: Mar. 10, 2015

(54) CANONICAL MECHANISM FOR SECURELY ASSEMBLING FEATURES INTO A MOBILE APPLICATION

(71) Applicant: Oracle International Corporation, Redwood Shores, CA (US)

(72) Inventors: Noel Poore, Mont Vernon, NH (US); William Bruce Kilgore, Tempe, AZ (US); Anki R. Nelaturu, Santa Clara, CA (US); Hinkmond B. Wong, Sunnyvale, CA (US); Edward J. Farrell, Los Gatos, CA (US); Dov Zandman, Cupertino, CA (US); Christopher J. Plummer, San Martin, CA (US); David Robert Martin, Atlanta, GA (US); Denis J. Tyrell, Livermore, CA (US)

(73) Assignee: Oracle International Corporation, Redwood Shores, CA (US)

( * ) Notice: Subject to any disclaimer, the term of this patent is extended or adjusted under 35 U.S.C. 154(b) by 26 days.

(21) Appl. No.: 13/657,778

(22) Filed: Oct. 22, 2012

(65) Prior Publication Data
US 2013/0283251 A1 Oct. 24, 2013

Related U.S. Application Data

(60) Provisional application No. 61/581,463, filed on Dec. 29, 2011.

(51) Int. Cl.
*G06F 9/44* (2006.01)
*G06F 9/45* (2006.01)
*G06F 9/455* (2006.01)
*G06F 9/54* (2006.01)

(52) U.S. Cl.
CPC .............. *G06F 8/00* (2013.01); *G06F 9/45504* (2013.01); *G06F 9/546* (2013.01); *G06F 9/45529* (2013.01)

USPC .......... 717/166; 717/115; 717/116; 717/118; 717/148

(58) Field of Classification Search
None
See application file for complete search history.

(56) References Cited

U.S. PATENT DOCUMENTS

| 6,571,316 | B1 | 5/2003 | D'Souza et al. | |
|---|---|---|---|---|
| 6,675,371 | B1 | 1/2004 | York et al. | |
| 7,123,933 | B2 | 10/2006 | Poor et al. | |
| 7,263,696 | B1 * | 8/2007 | Gruttadauria et al. | 717/166 |
| 7,788,660 | B2 * | 8/2010 | Chinnappa et al. | 717/166 |
| 8,176,469 | B2 * | 5/2012 | Lucas | 717/108 |

(Continued)

OTHER PUBLICATIONS

Joelsson, T., Mobile Web Browser Extensions: Utilizing local device functionality in mobile web applications, Master of Science Thesis, 2008, 64 pages, [retrieved on Oct. 21, 2014], Retrieved from the Internet: <URL:http://www.diva-portal.org/smash/record.jsf?pid=diva2:511443>.*

(Continued)

*Primary Examiner* — Thuy Dao
*Assistant Examiner* — Geoffrey St Leger
(74) *Attorney, Agent, or Firm* — Kilpatrick Townsend & Stockton LLP

(57) ABSTRACT

A native application built for a mobile device can embed non-native JAVA code that may be executed by a JAVA virtual machine also embedded as a library within the native application. Enterprise applications may be extended for use by mobile devices. Business logic for an application may be constructed just once and then used in both enterprise applications and mobile device applications.

20 Claims, 7 Drawing Sheets

(56) References Cited

U.S. PATENT DOCUMENTS

| | | | |
|---|---|---|---|
| 8,196,129 B2* | 6/2012 | Martin et al. | 717/166 |
| 8,443,345 B2* | 5/2013 | Carteri et al. | 717/137 |
| 2003/0154467 A1 | 8/2003 | Charnell | |
| 2003/0192036 A1 | 10/2003 | Karkare et al. | |
| 2004/0015936 A1* | 1/2004 | Susarla et al. | 717/166 |
| 2004/0158813 A1* | 8/2004 | Xia et al. | 717/116 |
| 2004/0261069 A1* | 12/2004 | Verbeke et al. | 717/166 |
| 2007/0006203 A1* | 1/2007 | Marwinski | 717/166 |
| 2007/0168953 A1* | 7/2007 | Diez et al. | 717/118 |
| 2007/0256086 A1 | 11/2007 | Srinivasan et al. | |
| 2008/0127143 A1* | 5/2008 | Lagergren | 717/148 |
| 2008/0134153 A1* | 6/2008 | Lucas | 717/137 |
| 2008/0178151 A1* | 7/2008 | Chan et al. | 717/115 |
| 2008/0229299 A1* | 9/2008 | Martin et al. | 717/163 |
| 2009/0172657 A1* | 7/2009 | Makelainen et al. | 717/174 |
| 2009/0193404 A1 | 7/2009 | Kielstra et al. | |
| 2010/0131951 A1* | 5/2010 | Carteri et al. | 718/100 |
| 2012/0272239 A1 | 10/2012 | Kalle et al. | |

OTHER PUBLICATIONS

Charland, A., et al., Mobile application development: Web vs. Native, Communications of the ACM, vol. 54 Issue 5, May 2011, pp. 49-53, [retrieved on Oct. 21, 2014], Retrieved from the Internet: <URL:http://dl.acm.org/>.*

Non Final Office Action for U.S. Appl. No. 13/657,775 (Oct. 28, 2013). 15 pages.

Global Intelligence Alliance, "Native or Web Application? How Best to Deliver Content and Services to Your Audiences over the Mobile Phone", Apr. 2010, 38 pages.

mobiThinking, "Mobile applications: native v Web apps—what are the pros and cons?", Retrieved on Dec. 28, 2011, 3 pages, from URL: http://mobithinking.com/native-or-web-app.

International Search Report dated for application PCT/US2012/071445 (Apr. 4, 2013).

Notice of Allowance for U.S. Appl. No. 13/657,775 (Jun. 4, 2014) 10 pages.

Notice of Allowance for U.S. Appl. No. 13/657,774 (Jun. 9, 2014) 19 pages.

* cited by examiner

CANONICAL MECHANISM FOR SECURELY ASSEMBLING FEATURES INTO A MOBILE APPLICATION

CLAIM OF PRIORITY

The present application claims priority under 35 U.S.C. §119 to U.S. Provisional Patent Application Ser. No. 61/581,463; titled "ENABLING JAVA FUNCTIONALITY IN MOBILE APPLICATIONS"; filed on Dec. 29, 2011; and the entire contents of which are incorporated by reference herein.

BACKGROUND

A great deal of time an effort goes into the construction of an enterprise application. Development of such an application may involve the specification of multiple user interfaces and corresponding business logic that is invoked based on a user's interaction with elements of those user interfaces. In recent times, mobile devices such as smart phones have become so popular as to become the premier computing device that a person might be most likely to use on a daily basis. Unfortunately, applications developed for enterprise scenarios often cannot be ported with simplicity over to a mobile device context. One of the obstacles sometimes confronting an application developer who might wish to make his enterprise application available to mobile devices is the possibility that the enterprise application might rely heavily on the JAVA programming language, while the mobile devices might not have any way of interpreting commands specified in that language. Mobile devices often do not come configured with a JAVA Virtual Machine. Consequently, application developers often are discouraged to find that they largely must start fresh when creating an application for execution on a mobile device, even in scenarios in which a substantial portion of the business logic for that application might already exist within a JAVA-based enterprise application.

DETAILED DESCRIPTION

Figure 1:
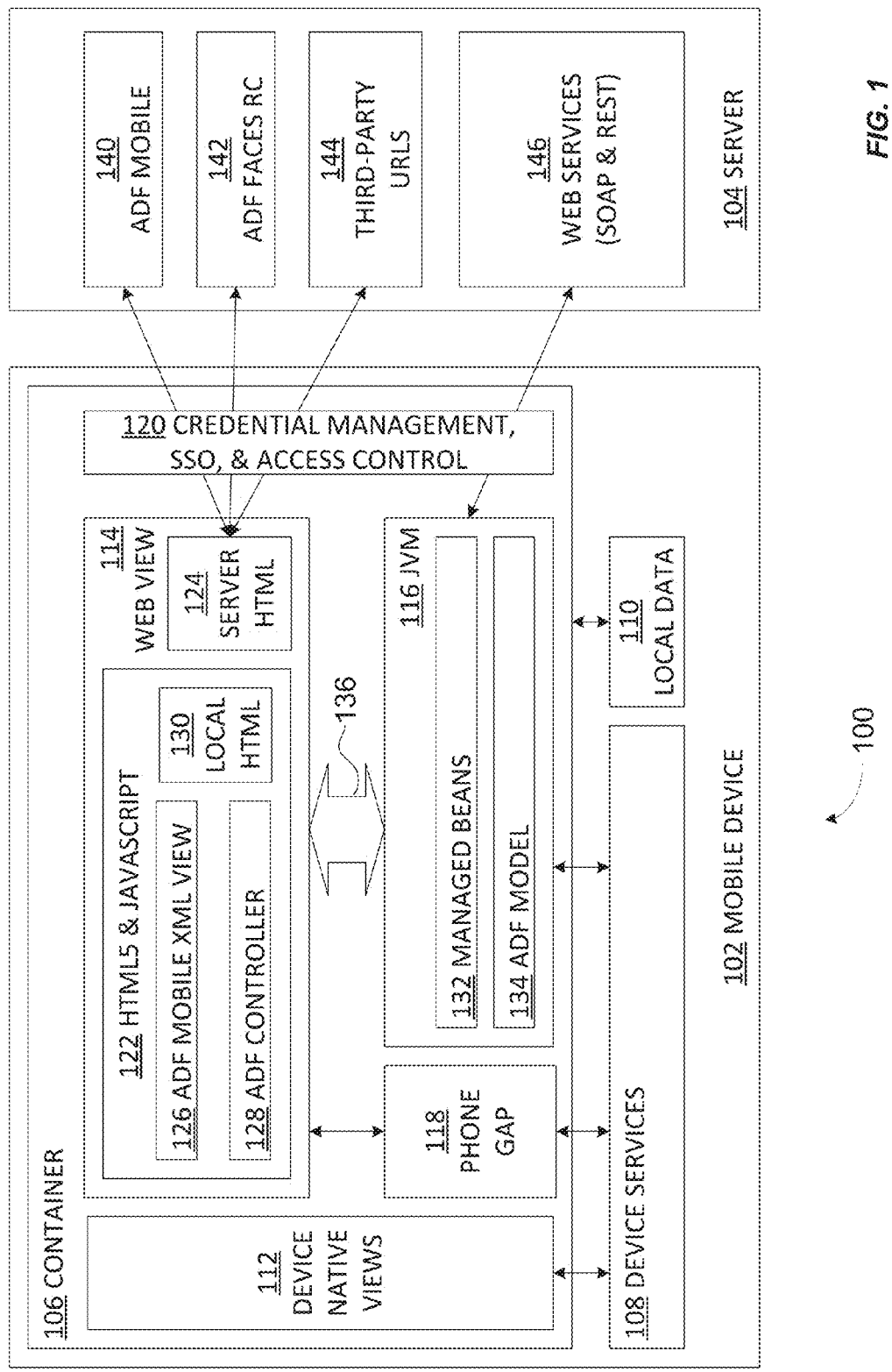
FIG. 1 is a block diagram that illustrates an example of a flexible runtime architecture, according to an embodiment of the invention.

In the following description, for the purposes of explanation, specific details are set forth in order to provide a thorough understanding of embodiments of the invention. However, it will be apparent that the invention may be practiced without these specific details.

Overview

An environment, in which applications can be built for mobile devices, is disclosed. More specifically, an environment in which native applications can be built for mobile devices is disclosed. As used herein, "native" means that the programming language used to write the source code for the application corresponds to the operating system, or platform, of the mobile device. Thus, on a mobile device having an iOS platform, a native application might be written in the Objective C programming language. On a mobile device having an Android platform, a native application might be written in the JAVA programming language. From the perspective of the user of the mobile device, a native application is downloaded by the mobile device and executes on the mobile device.

Using techniques described herein, enterprise applications may be extended for use by mobile devices. Business logic for an application may be constructed just once and then used in both enterprise applications and mobile device applications.

Container

Embodiments of the invention may involve a "container," which is written in the native programming code corresponding to the mobile device platform. The container contains all of the components that are needed to allow native applications to interact with the mobile device's operating system. These components allow the native applications to perform all of the kinds of operations that a typical application would need to be able to perform. Such operations may include listening to events, reacting to events, controlling system resources, and displaying user interfaces. The container also may provide security features.

As is discussed above, an environment in which native applications can be built for mobile devices is disclosed. Different environments may be constructed for different mobile device platforms. For example, one environment may be constructed in the Objective C programming language, while another environment may be constructed in the JAVA programming language. Ideally, an application developer is spared from having to worry about the details of the programming language in which the environment has been constructed. Therefore, the container, which provides the environment for native applications, is generated for the application developer.

Embedded Java Virtual Machine

In one embodiment of the invention, a JAVA Virtual Machine (JVM) is embedded within the container. The JVM may be embedded as a library, or as a slave process. The JVM allows native applications to execute business logic in the JAVA programming language. This may be the case even if the native applications are not written in the JAVA programming language. Within the container, the JVM may interpret, or otherwise exercise, the native applications' JAVA-based business logic.

Web View

In one embodiment of the invention, the native applications' user interfaces utilize a web view component within the container. This permits the native applications to generate user interfaces using Hypertext Markup Language (HTML) 5.0. Such user interfaces may be viewed by a browser application executing on the mobile device. Connective components within the container connect the web view component with the embedded JVM, making the interaction between user interfaces and the JVM seamless. These connective components handle all of the interface-to-logic bridging on behalf of the native applications. Communication between the web view component and the JVM may be both forwards and backwards, in that information may flow from the web view component to the JVM and from the JVM to the web view component over the connective components. Such communications permit data changes to occur and to ripple through to other aspects of the native application.

Modular Elements

In one embodiment of the invention, the environment discussed above permits the construction of modular elements of a native application. Each of these modular elements is called a "feature" of the native application. Each feature may be imagined conceptually as a miniature sandbox that isolates that feature's data and operations from other features' data and operations, preventing one feature from inadvertently tainting another feature. Assuming the existence of features "A" and "B," any operations performed within feature "A" remain within feature "A," causing no interaction with feature "B," except in certain allowed instances that are at "application scope" level. Thus, an application developer can take pre-constructed features and use them as building blocks to construct a complete application. Each feature of the application is protected from each of the features of that application, thereby providing overall security, while connectivity between components is achieved.

User Interfaces

In one embodiment of the invention, the user interfaces of the native applications are similar to those found in the full-fledged Oracle Application Development Framework. In one embodiment of the invention, the user interface is constructed by a developer in a development environment. In this environment, the developer drags and drops user interface components, from a set of user interface components, into the user interface being constructed. These components may be dragged and dropped together in order to connect these components with each other functionally. In one embodiment of the invention, a declarative language is used to bind user interface elements to underlying business logic and business objects that implement such logic. In one embodiment of the invention, an Oracle Application Development Framework (ADF) mobile extensions (AMX) layer enables this declarative-style binding. Further information regarding the Oracle ADF may be found in "Oracle ADF 11g Primer: Introduction to the Building Blocks of a Fusion Web Application" (published on the Internet in April 2007), the entire contents of which are incorporated by reference herein.

In one embodiment of the invention, a binding layer, which enables the binding of user interface elements to business objects, is split into two different parts. One part of the binding layer is contained within a JAVAScript environment inside of the web view component discussed above, and another part of the binding layer is contained within a library that is embedded within the container, as discussed above. As is discussed above, in one embodiment of the invention, this library represents an embedded JVM. In one embodiment of the invention, all of the binding between user interface elements and business objects is performed within this multi-part binding layer.

In one embodiment of the invention, JAVA objects are executed within slave threads as a library. A user interface in a main thread may interact with these JAVA objects. The performance of the binding and interaction in the manner discussed above makes the binding and interaction seamless for the application developer.

Flexible Runtime Architecture

FIG. 1 is a block diagram that illustrates an example of a flexible runtime architecture 100, according to an embodiment of the invention. Architecture 100 includes a mobile device 102 and a server 104. Mobile device 102 includes a container 106, device services 108, and local data 110. Container 106 includes device native views 112, a web view 114, a JVM 116, and a phone gap 118. Container 106 additionally includes credential management, single sign-on (SSO), and access control 120. Web view 114 includes HTML5 & JAVAScript 122, and server HTML 124. HTML5 & JAVAScript 122 includes ADF mobile extensible markup language (XML) view 126, ADF controller 128, and local HTML 130. JVM 116 includes managed beans 132 and ADF data model 134. In one embodiment of the invention, web view 114 communicates with JVM 116 through one or more virtual machine channels 136. Device services 108 are communicatively coupled with device native views 112, phone gap 118, and JVM 116. JVM 116 is also communicatively coupled with local data 110. Phone gap 118 is also communicatively coupled with HTML5 & JAVAScript 122. Phone gap 118 may be implemented via an open source project.

Server 140 includes ADF mobile 140, ADF faces rich client (RC) 142, third-party uniform resource locators (URLs) 144, and web services (SOAP & REST) 146. SOAP stands for Simple Object Access Protocol. REST stands for Representational State Transfer. Server components 140-144 are communicatively coupled with server HTML 124 through container component 120. Similarly, web services (SOAP & REST) 146 are communicatively coupled with JVM 116 through container component 120.

In one embodiment of the invention, container 106 is programmatic code written in the native programming language corresponding to the platform of mobile device 102. Container 106 is the shell in which native applications execute. Container 106 handles interactions with the operating system of mobile device 102. Container 106 listens for events. Essentially, container 106 constitutes the main body of a native application executing on mobile device 102. For example, a telephone application executing on mobile device 102 typically needs to be able to perform a certain set of operations in order to interact properly with the operating system of mobile device 102. Container 106 enables the application to perform such operations. In one embodiment of the invention, container 106 contains multiple sub-systems. Container 106 wraps around and connects these sub-systems together. These sub-systems may include, for example, sub-systems 112-120 illustrated in FIG. 1. Some of these sub-systems are discussed in greater detail below.

In one embodiment of the invention, device native views 112 includes views, such as user interfaces, that are native to mobile device 102. The presence of device native views 112 enables applications executing on mobile device 102 to access such native user interfaces of mobile device 102.

In one embodiment of the invention, web view 114 manages HTML 5.0 components of the application that executes on mobile device 102. Web view 114 enables such an application to access systems that may be external to mobile device 102. These external systems may be accessible through remote URLs, for example. Web view 114 manages local HTML 130 that may be used by the application. Web view 114 also manages ADF mobile XML view 126, which enables programmatic constructs of the application to be specified in a declarative manner. According to an embodiment, declarative components combine the functionality of multiple ADF components. ADF components may include, without limitation, layout components, table and tree components, list of value (LOV) components, input components, navigation components, output components, query components, data visualization components, etc. According to an embodiment, declarative components have no business logic and are not data bound. The developer of the declarative component can hide attributes of that component so that consumers are prevented from changing those attributes. Web view 114 also includes ADF controller 128, which, in one embodiment, manages a user interaction and application flow that the application developer defines in a task flow. A task flow, specified by the application developer, defines an application task. The definition of the task may include web pages and business logic that interacts to allow a user to complete the task. In one embodiment, ADF controller 128 enables transitions between web pages of the native application during the application's execution; ADF controller 128 processes user input, handles errors, and determines which web pages a user of the application ought to see at any given point during the application's execution.

In one embodiment of the invention, credential management, SSO, and access control 120 performs security functions on behalf of the native application. The presence of component 120 relieves the application developer from the burden of custom coding such security functions into the native application. Component 120 may provide sign-on capabilities to the native application under circumstances in which the native application attempts to access an external (to mobile device 102) resource that requires such sign-on to occur prior to granting access. Such a sign-on may be single-tenant or multi-tenant. Such a sign-on may be using the HTTPS protocol or may be non-secure. In one embodiment, all secure transactions in which the native application engages with external resources pass through component 120. Web page fetches, web service calls, and REST calls are types of operations that may be performed as a part of such a secure transaction. Component 120 provides, to the native application, protection from potentially malicious external resources.

In one embodiment of the invention, JVM 116 is implemented as an embedded JAVA library. In one embodiment of the invention, JAVA code written by an application developer is executed within JVM 116. JVM 116 is a separate thread and sub-system that executes such JAVA code within container 106.

In an embodiment of the invention, JVM 116 includes managed beans 132 and ADF model 134. In one embodiment, ADF model 134 implements data access and business logic. ADF model 134 may include a data-binding facility that connects a view layer of the application to a data and business services layer of the application. The view layer typically includes a web page having user interface components. The data-binding facility may call business services that are implemented by managed beans 132. Managed beans 132 are reusable software components for JAVA. Managed beans 132 are classes that are written in the JAVA programming language and that conform to a particular convention. Managed beans 132 may be used to encapsulate many separate JAVA objects into a single object (a bean), so that those multiple JAVA objects can be passed around to different parts of the native application as a single bean object instead of as multiple individual JAVA objects.

In one embodiment of the invention, local data 110 is a database that contains data that the native application may read, update, and/or store locally on mobile device 102. Such data may be encrypted or non-encrypted. In one embodiment of the invention, container 106 provides database connectivity services that allow the native application to access local data 110 in a database-oriented manner.

In one embodiment of the invention, device services 108 includes other applications and services and features that typically come shipped with mobile device 102. Such services may include, for example, a calendar service, a telephony service, a camera service, a global positioning system (GPS) service, etc. In one embodiment of the invention, container 106 makes device devices 108 available for use by the native application through a data control facility. If the service that the native application is using is a telephony service, then the native application may access that telephony service through phone gap 118. For purposes of discussion herein, both devices services 108 and local data 110 are considered to be external resources, even though they reside on mobile device 102, because those resources are not contained within container 106.

Resources provided by server 104 are also considered to be external resources for purposes of discussion herein, as such resources are external to container 106 as well as mobile device 102. Server 104 may be an enterprise server, for example. Mobile device 102 may access server 104 through one or more networks, typically including one or more wireless networks and the Internet. The native application executing on mobile device 102 may request a remote web page from a resource resident on server 104. Under such circumstances, component 120 of container 106 may determine which parts of the executable code specified within the remote web page are permitted to execute on mobile device 102. Component 120 may prevent certain parts of such executable code from executing on mobile device 102 if those parts are deemed to be security risks. A remote web page utilized by the native application may include resources such as ADF mobile 140, ADF faces RC 142, and third-party URLs 144. ADF mobile 140 includes a set of controls that a native application may utilize. Such controls may be shown within web view 114. ADF faces RC 142 includes, without limitation, layout components, table and tree components, list of value (LOV) components, input components, navigation components, output components, query components, data visualization components, etc.

The native application additionally or alternatively may make SOAP or REST calls to web services 146 on server 104 in order to obtain data from server 104. Although the native application may use web services 146 as a major conduit for obtaining and storing application data, the native application additionally may cache such data locally on mobile device 102. For example, the native application may store such data within local data 110, and/or the native application may retain such data within the random access memory allocated to container 106.

Embedding a JVM, Runtime Library, and Application Code as a Slave Environment in a Native Application Techniques described herein enable a JVM, runtime library, and application code to be embedded as a slave environment within a native application. This embedding enables JAVA code to be executed as part of a native application (which might not have been written in JAVA). In one embodiment of the invention, JVM 116, as well as a runtime library and JAVA application code, is embedded into the native application, making it possible for the native application to execute JAVA code even under circumstances in which no standalone JAVA Runtime Environment otherwise resides on mobile device 102.

Embedded JVM 116 provides a way to embed the execution of JAVA programs into the native application. This allows, for example, a user interface to be presented by the native application while business logic or other code is executed within the JAVA environment. In one embodiment of the invention, the JAVA code executes independently from and asynchronously with the native portion of the application within threads that are created and managed by JVM 116. The embedding of JVM 116 within the native application makes possible the native application's use of JAVA code without requiring the native application to depend on any JAVA Runtime Environment that is external to the native application. Such a benefit is especially valuable under circumstances in which, for technical or commercial reasons, such a standalone external JAVA Runtime Environment is unavailable or prohibited. Because JVM 116 is embedded within the native application, entities external to native application do not need to have any awareness that JVM 116 exists; the native application may interact with external resources just as though JVM 116 did not exist.

According to an embodiment of the invention, actual JAVA code is embedded inside of a native application (which might not be written in JAVA) in such a way that the native code of the application and the JAVA code can interact and work with each other. This approach may be contrasted with an approach in which only the functionality of a JAVA program is implemented using native code.

In one embodiment of the invention, container 106 includes a port of the following to the native operating system of mobile device 102: CVM JVM, CDC, Foundation Profile, Security Optional Package, and JSR-169 (JDBC) runtime libraries. The JVM and the runtime libraries are packaged as native libraries which are linked with the native application. Embodiments of the invention include a native application programming interface (API) that enables JVM 116 to be executed by the code of the native application. This API provides the ability to pass, to JVM 116, both runtime parameters and the initial JAVA class. At the time that the application developer creates the native application, portions of the runtime library may be ROMized in order to increase runtime performance and reduce startup time. The application developer can debug his JAVA code using standard JAVA tools even though the JAVA code is embedded into the native application. This capability may be available to the application developer regardless of whether the application developer is using a native debugger.

In one embodiment of the invention, container 106 includes one or more virtual machine channels 136. In one embodiment of the invention, in response to the first time that JAVA code needs to be used by the native application, container 106 creates JVM 116 and its sub-system based on the library that is embedded within the native application. Thus, in one embodiment of the invention, the creation of JVM 116 and its sub-system is performed in a lazy manner—put off until its performance becomes necessary. The creation of JVM 116 and its sub-system may be in response to the native application's invocation of a JAVA command, for example. Alternatively, the creation of JVM and its sub-system may be in response to the native application's reference to a JAVA binding.

In one embodiment, a JAVAScript portion of a binding detects that the binding needs to be accessed within a JAVA subsystem. In response to detecting this, the JAVAScript portion makes a reference call via phone gap 118. Container 106 intercepts the phone gap command. In response to intercepting the phone gap command, container 106 determines whether JVM 116 and its sub-system exist yet in executing form. In response to a determination that JVM 116 and its sub-system do not yet exist in executing form, container 106 creates JVM 116 and its sub-system based on the library embedded in the native application. Container 106 may perform a thread fork in order to create JVM 116 and its sub-system. In one embodiment of the invention, in addition to creating JVM 116 and its sub-system, container 106 also establishes at least one virtual machine channel 136. This virtual machine channel forms a communicative connection between container 106 and the sub-system of JVM 116. More specifically, in one embodiment, the virtual machine channel forms a connection between container 106 and a microserver, called the feature context manager, within the sub-system of JVM 116. This feature context manager has control of all of the bindings and resources that are within the sub-system of JVM 116.

In one embodiment of the invention, a separate one of virtual machine channels 136 is additionally created for each separate feature within the sub-system of JVM 116. Each such virtual machine channel is a peer-to-peer communication channel between web view 114 and the particular feature (within the sub-system of JVM 116) to which that virtual machine channel is connected. The creation of virtual machine channels 136 creates pairings between parallel entities: between web view 114 and the feature to which the virtual machine channel is connected. Consequently, web view 114 may interact with each feature via that feature's own virtual machine channel using a message-passing system.

Thereafter, whenever the native application requests a property of a JAVA object that resides within the sub-system of JVM 116, the virtual machine channel for that JAVA object is used to retrieve that property transparently to the application developer. That property is placed, transparently to the application developer, in the memory address space of the native application for use thereby. The native application may then access the property from its own memory address space via a normal memory fetch operation.

In one embodiment, in order to increase the speed of the system, references by the native application into the sub-system of JVM 116 are avoided whenever possible. In order to help avoid such references, in one embodiment, data obtained from the sub-system of JVM 116 in the manner discussed above is cached in the memory address space of the native application outside of the sub-system of JVM 116. Cache coherency is achieved, in one embodiment, via back-channel communications that container 106 automatically conducts without requiring the awareness or involvement of the application developer.

In addition to reading properties of JAVA objects using the techniques described above, the native application can use techniques described below in order to set properties of those JAVA objects. In one embodiment, the setting of properties of these JAVA objects is achieved via a write-through cache maintained within web view 114. In response to web view 114 detecting that a value has been written to the write-through cache, web view 114 uses the appropriate one of virtual machine channels 136 to cause the value to be propagated to the appropriate JAVA object to whose property the written value pertains. Thus, the property of the JAVA object within the sub-system of JVM 116 is updated from the write-through cache.

In one embodiment of the invention, the sub-system of JVM 116 includes a validation mechanism that determines whether types are appropriate before permitting values to be assigned to JAVA objects. For example, in response to detecting that an attempt is being made to assign a string type value to a float type property, the validation mechanism may detect that the attempted assignment is invalid. In response to detecting that the attempted assignment is invalid, the validation mechanism prevents the assignment and throws an exception that the native application is designed to handle. Additionally, the validation mechanism causes the related write-through cache entry to reflect the value that the entry contained prior to the attempted invalid assignment. Alternatively, valid changes to JAVA object properties are propagated to web view 114, which may then refresh the native application's presentation to the user of mobile device 102 in order to reflect the change if relevant to a user interface.

In one embodiment of the invention, web view 114 of native application is attempts to invoke a method of a JAVA object within the sub-system of JVM 116. Web view 114 attempts to invoke this method by making a call to phone gap 118. Container 106 intercepts the phone gap command. In response to intercepting the phone gap command, container 106 places the command in the one of virtual machine channels 136 that is connected to the JAVA object to which the method invocation pertains. Components of the sub-system of JVM 116 then invoke the method relative to the appropriate JAVA object.

Under some circumstances, such a method invocation may pertain to a resource that resides on server 104 rather than mobile device 102. In response to detecting that the method invocation pertains to such an external resource, container 106 causes a REST web service call to be made to the appropriate one of web services 146 on server 104. Server 104 processes the request made within the call and returns a response to container 106. Container 106 responsively causes data contained within the response to be propagated to relevant JAVA objects within the sub-system of JVM 116. In a manner similar to that described above, binding updates are performed and updated values are propagated to web view 114, which may refresh the user interface accordingly.

In one embodiment of the invention, whenever a REST call is made to server 104 from container 106, that call passes through component 120. Component 120 responsively determines whether security is needed for the call, and, if so, the kind of security that is needed. Component 120 may detect a type of security protocol to be used in making the REST call. If single sign-on functionality is requested for the call, then component 120 may determine whether appropriate credentials for the sign-on reside on mobile device 102. Component 120 may embed these credentials within the call prior to sending the call onward to server 104.

In one embodiment of the invention, depending on the content of the response received from web services 146, web view 114 may determine that some or all of the content ought to be stored in various repositories resident on mobile device 102. For example, in response to determining that the web service response specifies a list of contacts, web view 114 may determine that the contacts within the list should be placed within a contact list of mobile device 102; this contact list may be external to and independent of the native application. In response to such a determination, web view 114—and, more specifically, ADF controller 128, may cause a command, specifying the content, to be sent to phone gap 118. In response to receiving the command, phone gap 118 may interface with device services 108 and cause an appropriate service (e.g., the contact list service) to receive and process the content specified by the command. In the case of the contact list service, for example, this processing may involve storing contacts (previously received in a web services reply from server 104) within a contact list maintained by the contact list service within device services 108.

In one embodiment, container 106 stores data into and retrieves data from local data 110 using JAVA Database Connectivity (JDBC) and a database driver. The communications between container 106 and local data 110 may be encrypted or non-encrypted. The native application may use local data 110 as a database to manage the native application's state data. Data within local data 110 may be used to set properties of JAVA objects within the sub-system of JVM 116. Subsequently, a user of the native application may access the properties of these JAVA objects via a user interface presented by web view 114. Again, data retrieved from local data 110 may be cached within container 106 in order to avoid more expensive transactions between container 106 and resources external to container 106.

Canonical Mechanism for Creating and Assembling Features into a Mobile Application In one embodiment of the invention, a canonical mechanism is provided to users, such as application developers, to create smaller application features. As used herein, a feature is a combination of presentation and business logic. The canonical mechanism enables these smaller features to be assembled into a single mobile application while clear separation of state is maintained. In order to prevent any individual feature from being corrupted or tampered with, in one embodiment, each feature is separately sandboxed so that its direct exposure to other features of the same mobile application is limited or eliminated completely. In one embodiment of the invention, a mobile application's presentation is separated from that mobile application's business logic by placing each of these into a separate, distinct application layer that is isolated from other application layers. Each of these layers may have separate code, data, and life-cycles. Beneficially, techniques disclosed herein enable multiple disjoint features to be blended together in an isolated manner so that more complex applications can be developed rapidly.

Techniques disclosed herein enabled multiple application features, which may be considered mini-applications, to be merged together into a single application. In order to promote or restrict the visibility of feature data, various different application-scope, feature-scoped, and page flow-scoped variable are supported. Using techniques disclosed herein, developers are enabled to determine which data is being exposed to various features of a metadata-driven application.

In order to enable the assembly of multiple different application features into a single application, an embodiment of the invention utilizes a canonical mechanism. In one embodiment, this canonicalization is achieved through the use of an expression language. The expression language used may be a standard expression language, for example. In one embodiment of the invention, the expression language used is JAVA Unified Expression Language.

The JAVA Unified Expression Language provides a way to simplify expressions in JAVA server pages (JSP). It is a simple language used for accessing implicit objects and JAVA classes, and for manipulating collections in an elegant manner. The language provides the ability to use run-time expressions outside of JSP scripting elements. The JAVA Unified Expression Language provides a pluggable, extensible, resolver mechanism, and a way to set data and invoke methods from a web page. Additional details regarding the JAVA Unified Expression Language can be found in "The JAVA EE 5 Tutorial" (© 2010 Oracle), which is incorporated by reference herein.

In one embodiment of the invention, container 106 includes a parser and evaluator constructed in JAVAScript and a parser and evaluator constructed in JAVA. These parsers and evaluators parse and evaluate JAVA Unified Expression Language expressions that are contained in web pages that the mobile application uses. Because container 106 includes a JAVAScript parser and evaluator, it is possible that the parsing and evaluation of some expressions may be done without utilizing the JAVA engine, which can produce gains in execution speed. Once the properties of JAVA objects have been initially obtained from the sub-system of JVM 116, those properties may be cached and later accessed using JAVAScript. Conversely, in one embodiment of the invention, properties of objects that have been parsed and evaluated using the JAVAScript parser and evaluator are cached within the sub-system of JVM 116, so that, thereafter, the JAVA parser and evaluator can access the properties of these objects without reference external to the sub-system of JVM 116.

In one embodiment of the invention, each data change event occurring within container 106 causes two mirrored copies of the same data to be modified: one copy within the sub-system of JVM 116 (the JAVA layer) and one copy within web view 114 (the JavaScript layer). Thus, in one embodiment of the invention, a change to data within web view 114 or JVM 116 is automatically pushed to the other of web view 114 and JVM 116.

According to an embodiment of the invention, isolation between features is maintained by sandboxing each object's data and that data residing in any cache. Thus, in one embodiment of the invention, each JAVA object in the sub-system of JVM 116 is prevented from accessing the data of any other JAVA object in that sub-system, and, additionally, each such JAVA object is prevented from accessing the cached data (e.g., in web view 114) of any other JAVA object. Furthermore, in one embodiment of the invention, each JAVA object in the sub-system 116 has its own one of virtual machine channels 136 that no other JAVA object shares. Communications between a JAVA object and that JAVA object's analogue in web view 114 are, in one embodiment of the invention, conducted exclusively through the particular virtual machine channel assigned to that JAVA object and its analogue in web view 114.

In one embodiment of the invention, each separate application feature is loaded with a separate JAVA class loader assigned exclusively to that application feature and no other. A system class loader loads all classes that are application-scoped. However, each feature may contain its own class loader that is a child of the system class loader. Because each feature is loaded by its own class loader, no feature is able to access the data of any other feature directly. This is the case even if two separate features are defined in the same class file.

In one embodiment of the invention, a mobile application is constructed as a set of projects. One of these projects is designated the application controller project. All objects and data placed into the application controller project are deemed to be system-wide in scope. In contrast, each feature has its own separate project. Each feature may encompass a set of multiple classes. According to an embodiment, the class loader for a particular feature is only capable of accessing the classes that are in the set of classes that are encompassed by that particular feature. A class loader for one feature is unable to locate classes encompassed by other features. However, if a class is promoted into the application controller project, then that class can be located by the class loaders of all features, because then that class has become system-wide in scope. Through such promotion to system-wide scope, data can be shared between features even in a strongly sandboxed environment.

Virtual Channel for Embedded Process Communication

In one embodiment, the Virtual Machine Channel (VMChannel) provides a way to communicate between a native mobile application and an embedded virtual machine. In one such embodiment, the basic user interface aspects are performed by the native application whereas the business logic is performed by the embedded virtual machine. In order to provide this division, an ultra-fast channeling mechanism is provided that allows core channel and framework commands as well as application level messages to travel in both directions.

In one embodiment, the VMChannel provides bidirectional controlled communication. The communication is ultra-fast and priority based. Further, it provides a predictable life-cycle for both the channel and messages.

In one embodiment, the VMChannel provides a canonical mechanism for the presentation and business logic tiers to communicate within a single mobile application even though they are in completely discrete environments and memory spaces. The VMChannel is useful for interactions with an embedded virtual machine.

An embodiment of a VMChannel is incorporated into the ADF Mobile Framework product from Oracle Corporation.

In one embodiment, a VMChannel provides a messaging framework that enables communication flow between a native entity and a JAVA entity. The messaging framework enables a JAVA entity (e.g., JAVA code) to be able to send a message to a native entity (i.e., an entity implemented using native code), have the native entity do processing corresponding to the message, enable the native entity to send a response back to the JAVA entity corresponding to the message received from the JAVA entity, and for the JAVA entity to receive the response. In the other direction, a native entity may use a VMChannel to send a message to a JAVA entity and receive a response message from the JAVA entity via the VMChannel.

At a conceptual level, a VMChannel provides a communication channel between two end points. One of the end points can be a JAVA entity and the other can be a native entity. In one embodiment, the VMChannel provides a communication channel between JAVA messaging system and ADF messaging.

A mobile application is an application that is written for execution on a mobile device such as an iPhone, Blackberry, Android phone, etc. A native application for a device is an application that is specifically designed to run on that device's operating system and machine firmware. Typically, a native application written for a particular device has to be modified or adapted before it can run on a different device with a different operating system and/or device firmware. For example, a mobile native application written for an iPhone is designed to run on Apple's iOS operating system. As another example, a mobile native application designed for an Android phone is designed to run on the Android operating system. Examples of languages that may be used to code native applications include Objective C for the iPad/iPhone platform, Android JAVA for the Android platform, C# for the Microsoft mobile device platform, and others. It is to be understood that the type or nature of the native platform or the native language is not intended to limit the scope of embodiments of the present invention. A VMChannel may be used with various different platforms and native applications.

In one embodiment, a VMChannel enables asynchronous, symmetric, bi-directional messaging between two end points. In one embodiment, multiple VMChannels may be opened concurrently, each with its own life cycle. The multiple VMChannels are managed in a centralized manner. In one embodiment, a VMChannel allows for variable-sized messaging. In one embodiment, a VMChannel enables correlations to be specified between messages. The correlations may be used, for example, to implement a request-response messaging paradigm. In one embodiment, messages communicated using VMChannels may be prioritized.

As indicated above, a VMChannel enables communications between a JAVA entity (e.g., a JVM) and a native entity. The two entities may be executing on a mobile device. In one embodiment, the JAVA entity and native entity execute in the same process space. In alternative embodiments, the JAVA entity and the native entity may execute in different processes. The VMChannel architecture does not require the JAVA entity and the native entity to be in the same process space. The two entities do not even have to be on the same backplane.

In one embodiment, for a JAVA entity in communication with a native entity using a VMChannel, the JAVA entity may be used as a mini runtime engine within a native application comprising the native entity. The master of the application is the native code. The JAVA entity is a slave virtual machine that runs solely inside the native code application. In another embodiment, the JAVA entity may be a sibling of the native code.

Figure 2:
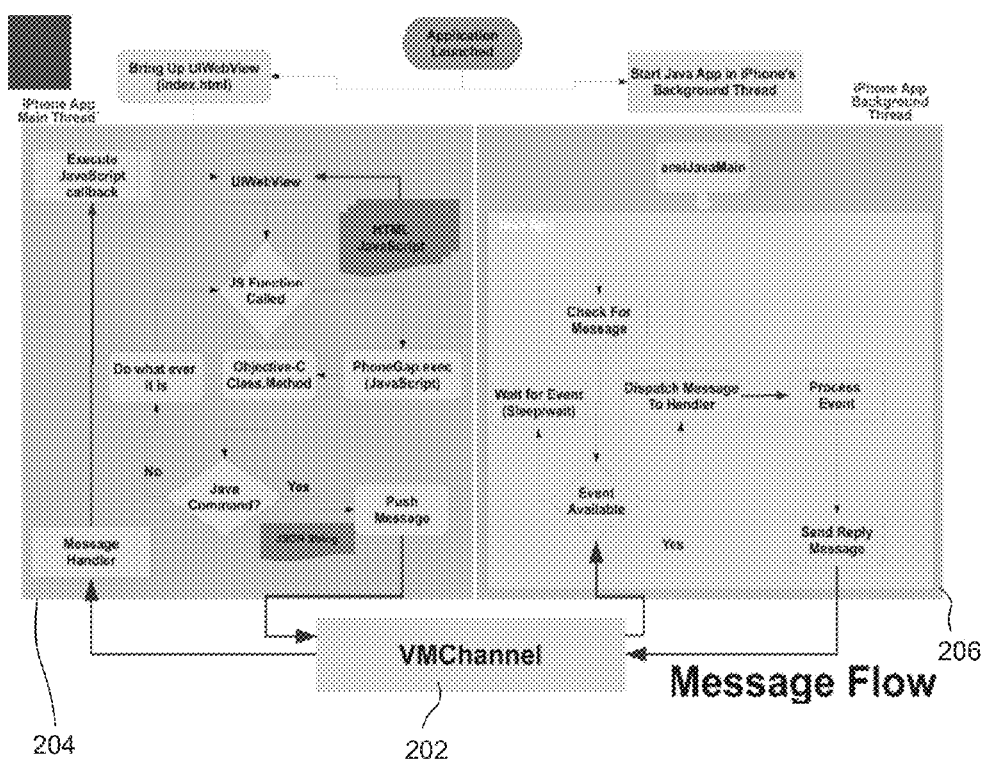
FIG. 2 depicts an example of how a VMChannel may facilitate flow of messages between a native entity and a JAVA entity according to an embodiment of the invention.

FIG. 2 depicts an example of how a VMChannel may facilitate flow of messages between a native entity and a JAVA entity according to an embodiment of the present invention. As shown in FIG. 2, a VMChannel 202 facilitates communications between a native entity 204 and a JAVA entity 206. In this example, the native entity and JAVA entity are part of the same native application. The application bundle may comprise an Objective C executable (*.exe) and JAVA lib compiled in. JAVA class files are treated as resources that run within the JDM lib. VMChannel 202 enables messages to be passed from native entity 204 to JAVA entity 206 and from JAVA entity 206 to native entity 204.

An application developer does not have to know of the VMChannel. The application developer can develop native code just the same as before, for example, using a native coding tool. The application developer may develop JAVA code using a tool such as JDev (JDeveloper). In one embodiment, when the application is built, the JAVA code is compiled into a bunch of *.jar files. The *.jars are then embedded into the native application, for example, as a property file, or as an image. When CVM is started, the Jar files are loaded as data and are executed within the CVM.

Referring again to FIG. 1, a JAVA entity (shown as JVM 116) is embedded as a library within the native application represented by container 106. VMChannels 136 are shown as an arrow between JVM 116 and the native code component. Both the native entity and the JAVA entity have their own separate address spaces within the address space of container 106. VMChannels 136 provide a communication channel to enable communications between the two. VMChannels 136 allows messages to be communicated between the two environments (i.e., native and JAVA) using a messaging protocol.

One or multiple VMChannels may exist concurrently, each running to different features/contacts. Each VMChannel provides security aspects such that a message cannot cross a boundary from one channel to another. A VMChannel provides a point-to-point channel between two end point entities.

A message sent on one VMChannel is not allowed to cross over to another VMChannel (i.e., no cross pollination). In one embodiment, the end points of a VMChannel are within the same application space but in their own separate addresses spaces. The two end points do not need to have the same process id. As the two entity end points are running in their own separate address spaces, the VMChannel enables communication between the two.

Multiple native entities can communicate with a single JAVA entity using VMChannels. Likewise, a single JAVA entity can communicate with multiple native entities using VMChannels. One or more VMChannels may be created and used for messaging between two entities.

In one embodiment, a VMChannel uses a networking style layered protocol for communication of messages. A message communicated via a VMChannel comprises a header and a body. The body stores the message content or payload. The header comprises information that is used for communicating the message via a VMChannel. In one embodiment, the header comprises information such as identification of a request, correlation information (e.g., a correlation id) that can be used for correlating a response message to a request message, priority information indicative of the priority for the message (e.g., higher priority messages are given preference over lower priority messages), quality of service information, and other information. In one embodiment, the header may comprise multiple headers corresponding to the different layers.

A VMChannel is responsible for marshaling and shoveling messages between two end points, where one end point can be in a JAVA environment while the other is in the native code. A VMChannel itself is message content agnostic, i.e., the VMChannel does not know/care about the actual contents of the body/payload of the message being communicated. Further, the size of messages communicated via a VMChannel does not need to be fixed. For example, one message could be 1 byte, another several bytes, and the like.

VMChannels are bi-directional, i.e., when using a VMChannel between a native entity and a JAVA entity, messages can be sent from the native entity to the JAVA entity and from the JAVA entity to the native entity using the same VMChannel. In a request-response scenario, a request can be initiated from the JAVA side or from the native side, and likewise a response can be sent from the JAVA side or from the native side.

Multiple messages may be pumped into a VMChannel from either end point. In one embodiment, a "supply-consumer" model may be used for the messaging, wherein a supplier entity can send multiple messages into the VMChannel, and the consumer entity can pick up a message at a time, process it, and then pick the next message, and so on. A VMChannel thus enables a symmetric, bidirectional, asynchronous messaging protocol.

Priorities may be assigned to messages such that higher priority messages within a VMChannel are handled before lower priority messages. In one embodiment, a VMChannel uses a priority-based queue to facilitate priority messaging.

In one embodiment, a VMChannel uses handlers on the native entity side and on the JAVA entity side. A message received by the VMChannel is provided to the handler at the receiving side for further processing of the message. In one embodiment, a handler is responsible for correlating responses to requests.

Figure 3:
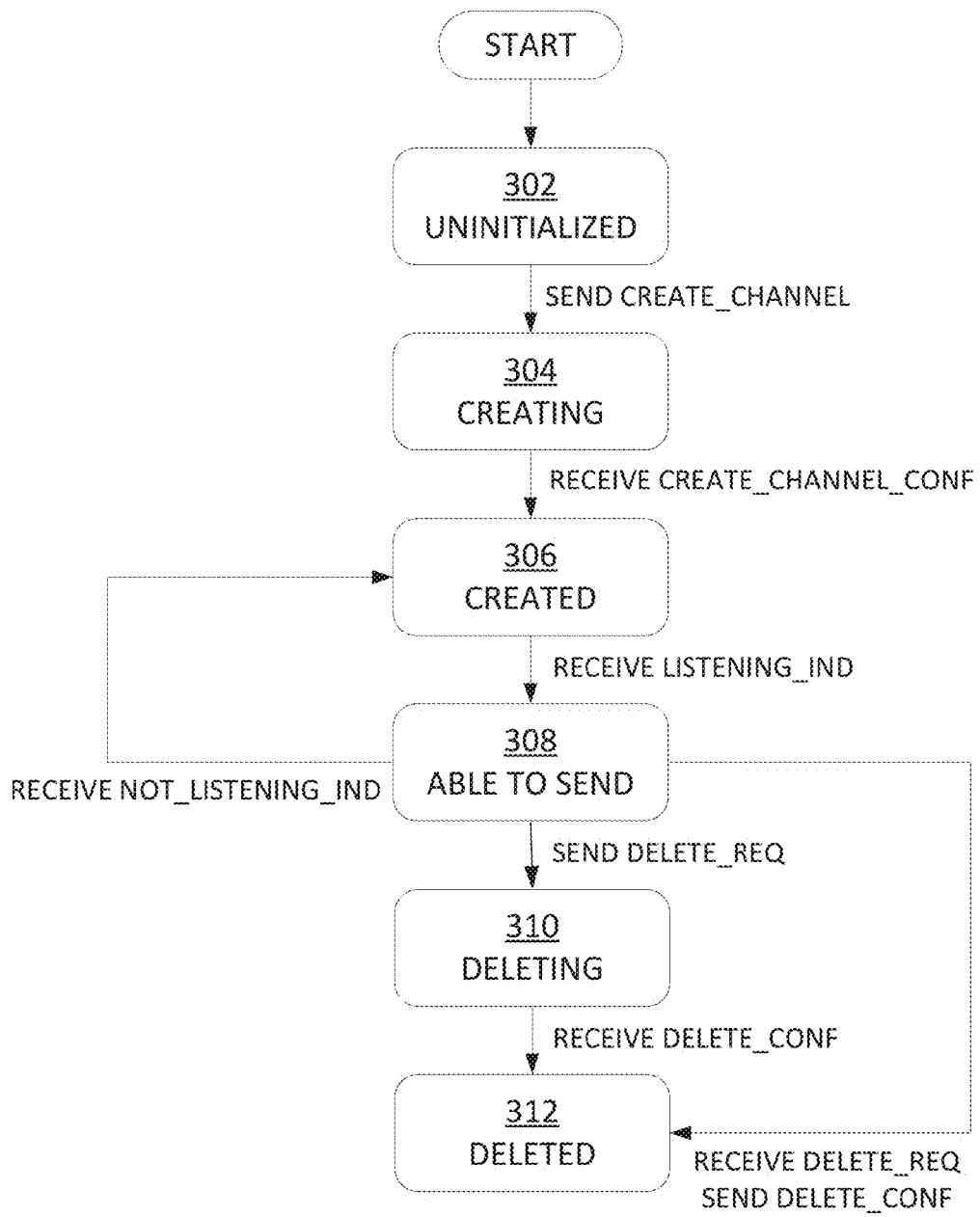
FIG. 3 depicts a state diagram for a VMChannel according to an embodiment of the invention.

FIG. 3 depicts a state diagram for a VMChannel according to an embodiment of the present invention. The VMChannel begins in state uninitialized 302. In response to the sending of a CREATE_CHANNEL message, the VMChannel transitions to state creating 304. In response to the receiving of a CREATE_CHANNEL_CONF message, the VMChannel transitions to state created 306. In response to the receiving of a LISTENING_IND message, the VMChannel transitions to state able to send 308. From state 308, if a NOT_LISTENING_IND message is received, then the VMChannel transitions back to state created 306. Alternatively, from state 308, if a DELETE_REQ message is received, then the VMChannel transitions to state deleting 310. Alternatively, from state 308, in response to the receiving of a DELETE_REQ message and the sending of a DELETE_CONF message, the VMChannel transitions to state deleted 312. From state 310, in response to the receiving of a DELETE_CONF message, the VMChannel transitions to state deleted 312.

Figure 4A:
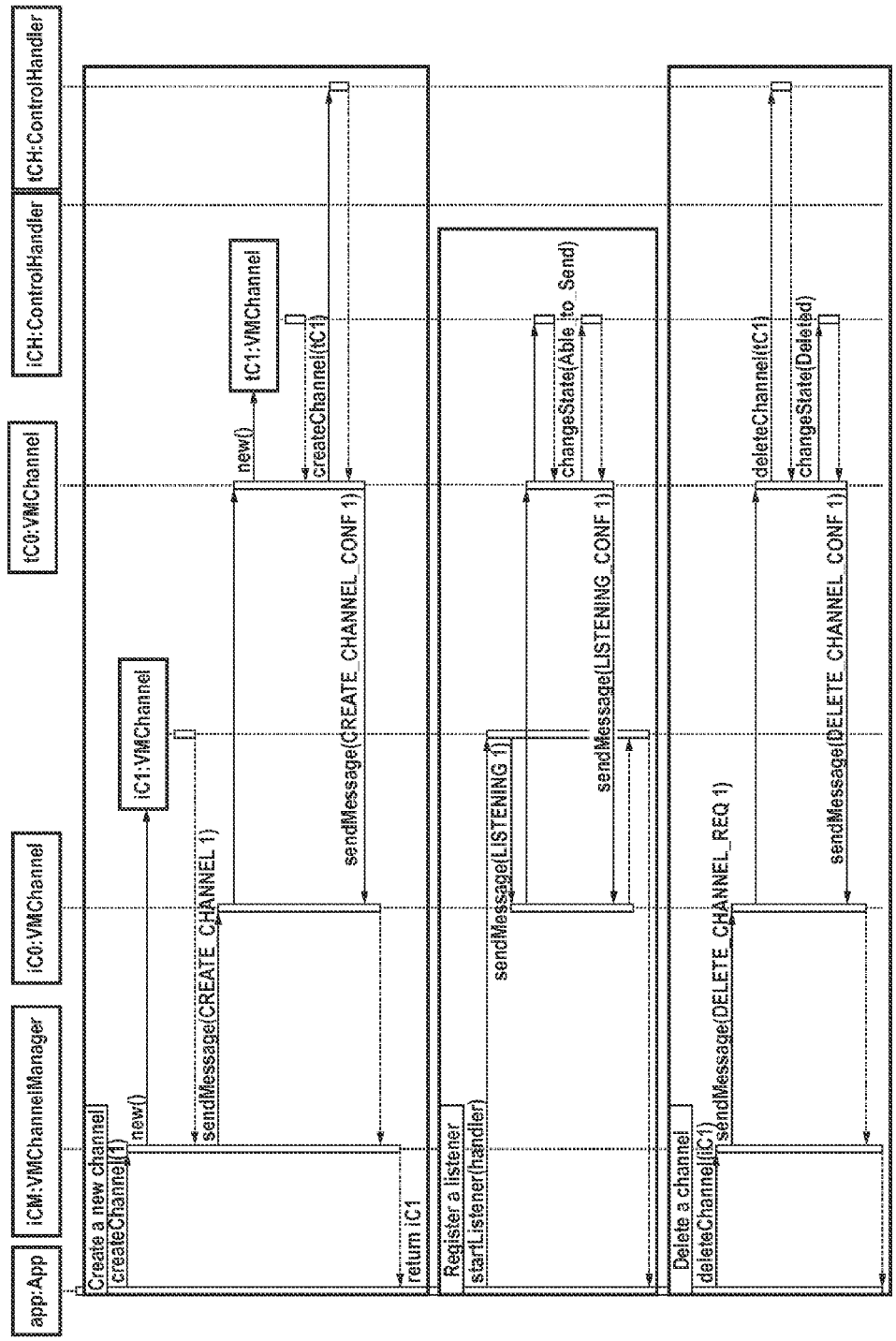
FIGS. 4A and 4B depict control message sequence diagrams for creating a VMChannel, registering a listener for a VMChannel, and deleting a VMChannel according to an embodiment of the invention.
Figure 4B:
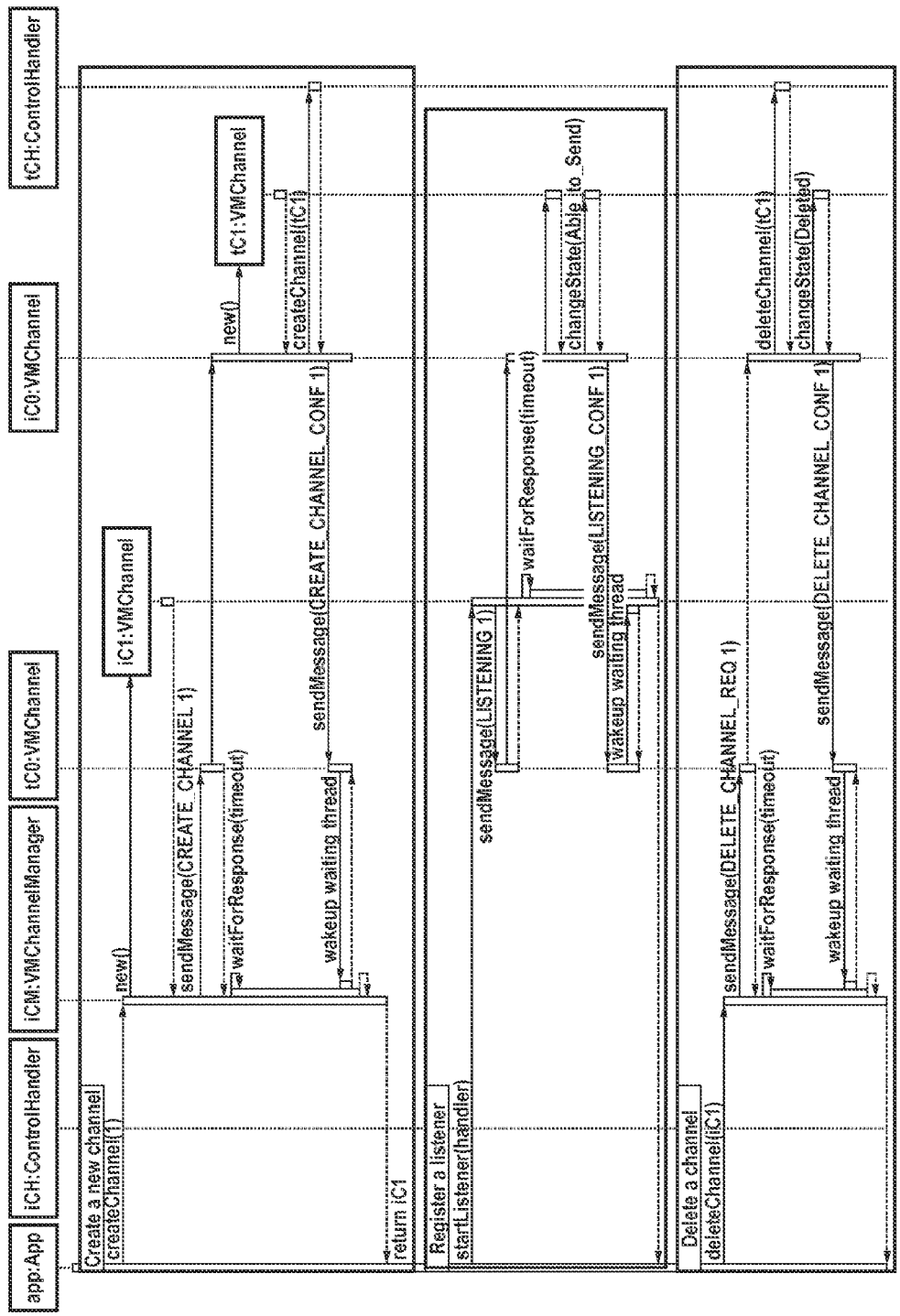

FIGS. 4A and 4B depict control message sequence diagrams for creating a VMChannel, registering a listener for a VMChannel, and deleting a VMChannel according to an embodiment of the present invention. For example, in FIG. 4A, a message is shuttled across from the native side to JAVA side. Once a message is in the VMChannel, a channel manager on the receiving side (e.g., on the JAVA side) detects the presence of the message in the VMChannel, retrieves the message from the VMChannel, and hands it to an appropriate handler for further processing. The message may then get processed and a response may be sent back. The response message is pushed into the VMChannel from the JAVA side and communicated over to the native side via the VMChannel. The channel manager on the native side then detects presence of the message, gets the message from the VMChannel, and hands it to a handler on the native side for further processing. In one embodiment, a handler may perform the correlation and may call an appropriate response handler.

There are various ways in which correlation between messages may be performed. For example, in one embodiment, correlations are done using a correlation/association ID. In one embodiment, when a request message is sent by a sender to a VMChannel, information is maintained on the sender side about the pending request. When a response message is received by the sender via the same VMChannel, a lookup is performed in the pending requests information to determine a corresponding request for the response. If such a request is found then the response is correlated to the request and the request may be removed from the pending requests information. An appropriate callback may be called based upon the success or failure of the response. If no pending request is found for the response, then an error condition may be indicated and error recovery processing initiated.

In one embodiment, there is a control channel, which is considered the master. Requestors (e.g., native entities or JAVA entities) may send requests for creation of additional VMChannels between two end points. The control channel then creates the requested VMChannel. A negotiation may take place between the two endpoints for the VMChannel to be created before the VMChannel is established. In one embodiment, multiple levels of negotiations may take place, for example, one at the application layer (ADF layer—correct routing, sandboxing, correlation), one at the protocol layer (VMChannel layer—ensure robust secure stable environment for messages). Various header portions may be used for the multilayered approach. Handlers are then associated with each side of the created VMChannel. On the native side, the one or more handlers may be written in a native language (e.g., objective C). On the JAVA side the one or more handlers are written in JAVA. A handler may be configured to perform various functions including but restricted to doing correlations, checking error conditions (e.g., check for whether it is an unsolicited response, invalid response), security and routing functions, and the like.

In one embodiment, a VMChannel ensures that no messages received by the VMChannel are dropped. The VMChannel ensures that a message is properly handled by someone listening on the receiving side. The VMChannel also handles time outs, determines when to abandon, perform breakdown of the VMChannel, etc.

VMChannels provide several features that were not previously available, especially on a mobile device. A VMChannel provides an asynchronous communication mechanism that is not bounded by size or directionality while providing quick access in a limited/small footprint such as on a mobile device. It offers flexibility coupled with priority. It provides a controlled environment for communication between two entities, which may be embedded or externalized, irrespective of who is the sender or receiver.

Hardware Overview

Figure 5:
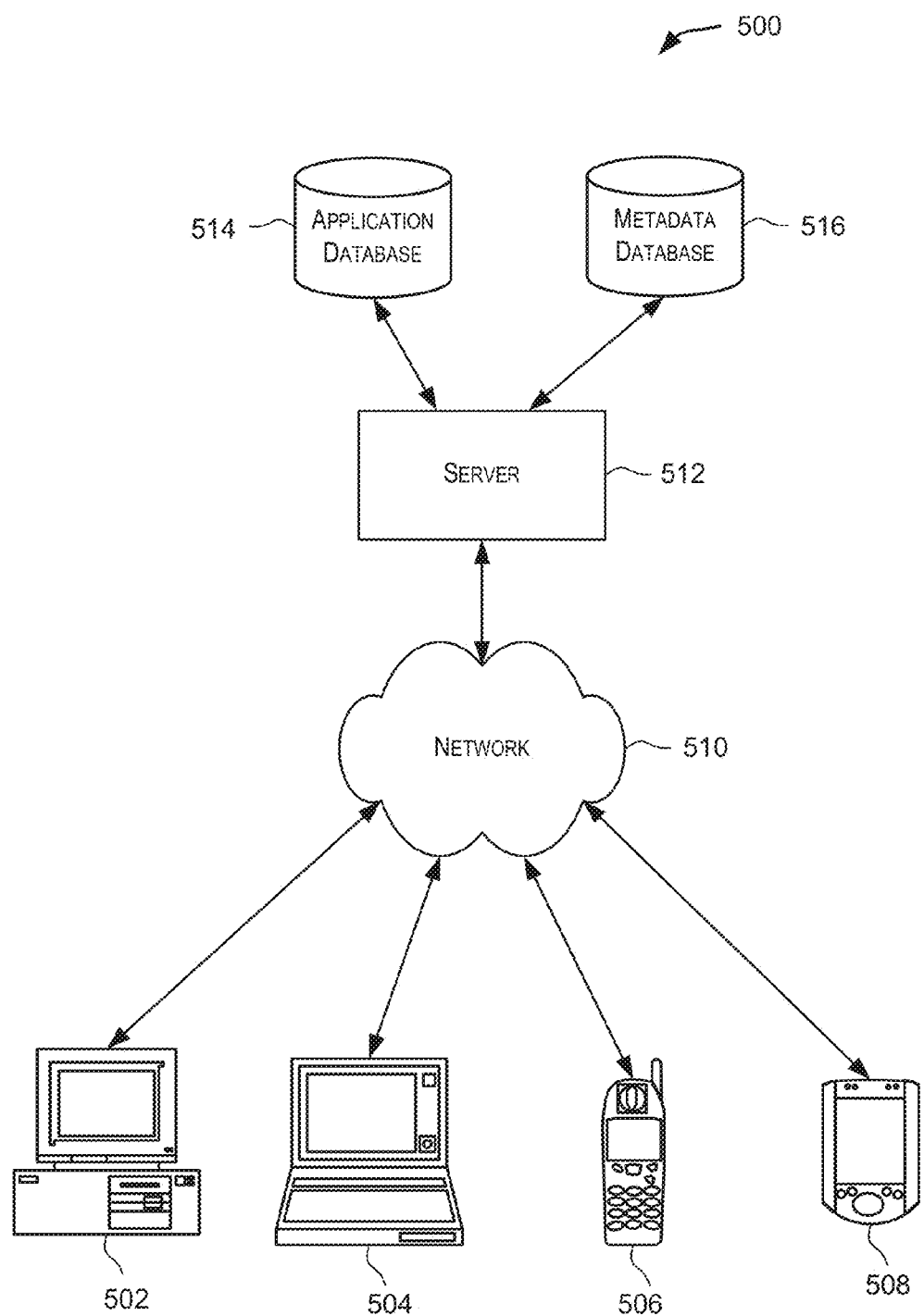
FIG. 5 is a simplified block diagram illustrating components of a system environment that may be used in accordance with an embodiment of the present invention.

FIG. 5 is a simplified block diagram illustrating components of a system environment 100 that may be used in accordance with an embodiment of the present invention. As shown, system environment 500 includes one or more client computing devices 502, 504, 506, 508, which are configured to operate client applications including native client applications and possibly other applications such as a web browser, or the like. In various embodiments, client computing devices 502, 504, 506, and 508 may interact with a server 512.

Client computing devices 502, 504, 506, 508 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 502, 504, 506, and 508 may be any other electronic device, such as a thin-client computer, Internet-enabled gaming system, and/or personal messaging device, capable of communicating over a network (e.g., network 510 described below). Although exemplary system environment 500 is shown with four client computing devices, any number of client computing devices may be supported. Other devices such as devices with sensors, etc. may interact with server 512.

System environment 500 may include a network 510. Network 510 may be any type of network familiar to those skilled in the art that can support data communications using any of a variety of commercially-available protocols, including without limitation TCP/IP, SNA, IPX, AppleTalk, and the like. Merely by way of example, network 510 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 500 also includes one or more server computers 512 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 512 may be adapted to run one or more services or software applications.

Server 512 may run an operating system including any of those discussed above, as well as any commercially available server operating system. Server 512 may also run any of a variety of additional server applications and/or mid-tier applications, including HTTP servers, FTP servers, CGI servers, JAVA servers, database servers, and the like. Exemplary database servers include without limitation those commercially available from Oracle, Microsoft, Sybase, IBM and the like.

System environment 500 may also include one or more databases 514, 516. Databases 514, 516 may reside in a variety of locations. By way of example, one or more of databases 514, 516 may reside on a non-transitory storage medium local to (and/or resident in) server 512. Alternatively, databases 514, 516 may be remote from server 512, and in communication with server 512 via a network-based or dedicated connection. In one set of embodiments, databases 514, 516 may reside in a storage-area network (SAN) familiar to those skilled in the art. Similarly, any necessary files for performing the functions attributed to server 512 may be stored locally on server 512 and/or remotely, as appropriate. In one set of embodiments, databases 514, 516 may include relational databases, such as databases provided by Oracle, that are adapted to store, update, and retrieve data in response to SQL-formatted commands.

Figure 6:
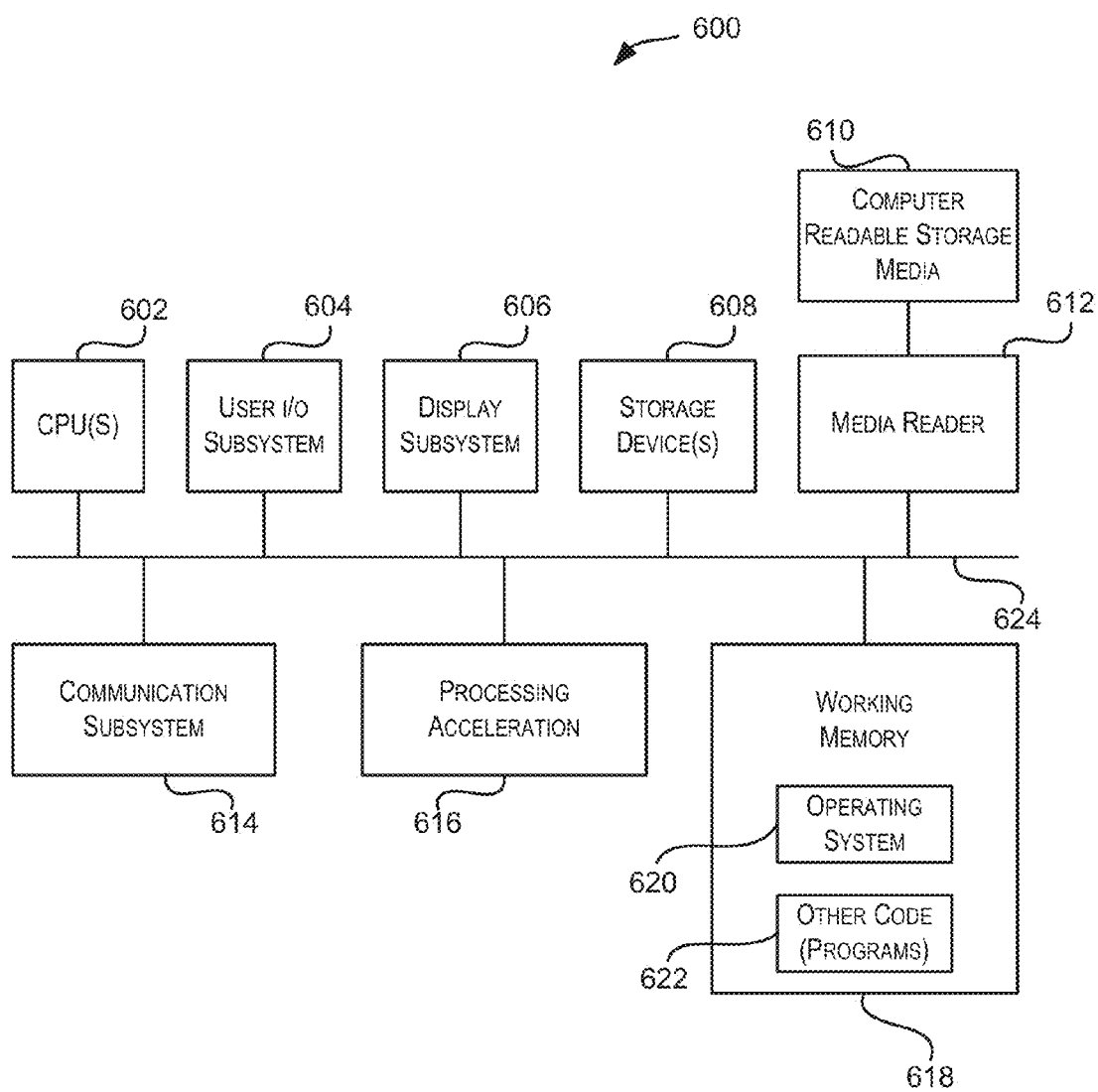
FIG. 6 is a simplified block diagram of a computer system that may be used in accordance with embodiments of the present invention.

FIG. 6 is a simplified block diagram of a computer system 600 that may be used in accordance with embodiments of the present invention. For example server 512 or clients 502, 504, 506, or 508 may be implemented using a system such as system 600. Computer system 600 is shown comprising hardware elements that may be electrically coupled via a bus 624. The hardware elements may include one or more central processing units (CPUs) 602, one or more input devices 604 (e.g., a mouse, a keyboard, etc.), and one or more output devices 606 (e.g., a display device, a printer, etc.). Computer system 600 may also include one or more storage devices 608. By way of example, the storage device(s) 608 may include devices such as disk drives, optical storage devices, and solid-state storage devices such as a random access memory (RAM) and/or a read-only memory (ROM), which can be programmable, flash-updateable and/or the like.

Computer system 600 may additionally include a computer-readable storage media reader 612, a communications subsystem 614 (e.g., a modem, a network card (wireless or wired), an infra-red communication device, etc.), and working memory 618, which may include RAM and ROM devices as described above. In some embodiments, computer system 600 may also include a processing acceleration unit 616, which can include a digital signal processor (DSP), a special-purpose processor, and/or the like.

Computer-readable storage media reader 612 can further be connected to a computer-readable storage medium 610, together (and, optionally, in combination with storage device(s) 608) comprehensively representing remote, local, fixed, and/or removable storage devices plus storage media for temporarily and/or more permanently containing computer-readable information. Communications system 614 may permit data to be exchanged with network 510 and/or any other computer described above with respect to system environment 500.

Computer system 600 may also comprise software elements, shown as being currently located within working memory 618, including an operating system 620 and/or other code 622, such as an application program (which may be a client application, Web browser, mid-tier application, RDBMS, etc.). In an exemplary embodiment, working memory 618 may include executable code and associated data structures used for relying party and open authorization-related processing as described above. It should be appreciated that alternative embodiments of computer system 600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile (non-transitory), removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope.

What is claimed is:

1. A method comprising:
   detecting that a native application executing on a computing device references a JAVA binding;
   in response to detecting that the native application references the JAVA binding, determining whether a JAVA virtual machine is currently executing on the computing device;
   in response to detecting that no JAVA virtual machine is currently executing on the computing device, creating the JAVA virtual machine from a library that is embedded within the native application;

loading a first set of classes on the computing device using a first class loader that is exclusive to the first set of classes and that is a child of a system class loader of the JAVA virtual machine;

loading a second set of classes on the computing device using a second class loader that is exclusive to the second set of classes and that is a child of the system class loader of the JAVA virtual machine;

accessing, from the native application, objects instantiated from the first set of classes and objects instantiated from the second set of classes; and evaluating, using a JAVA evaluator that is executed by the JAVA virtual machine and that is contained within a container created by the native application, a JAVA Unified Expression Language expression contained within a web page.

2. The method of claim 1, wherein the computing device is a mobile computing device, wherein the first and second sets of classes are sets of JAVA classes, and wherein the native application is not coded in JAVA.

3. The method of claim 1, further comprising:
promoting a particular class from one of the first and second sets of classes to a project that contains classes that have system-wide scope;
wherein said promotion causes objects instantiated from said particular class to become accessible to objects instantiated from said first set of classes and objects instantiated from said second set of classes.

4. The method of claim 1, further comprising:
evaluating, using a JavaScript evaluator, an expression that refers to an object instantiated from a particular class from the first set of classes.

5. The method of claim 1, further comprising:
caching, in a cache, results of said evaluating;
obtaining said results from cache without involving said JAVA evaluator; and
evaluating the JAVA Unified Expression Language expression using a JavaScript evaluator that is also contained within the container created by the native application.

6. The method of claim 5, further comprising:
determining that particular code within the web page is categorized as being risky; and
in response to determining that the particular code is categorized as being risky, executing code on the web page other than the particular code without executing the particular code.

7. The method of claim 1, further comprising:
in response to a data change event modifying a first object within a JAVA layer, modifying first data corresponding to the first object within a JavaScript layer; and
in response to a data change event modifying second data within the JavaScript layer, modifying a second object corresponding to the second data within the JAVA layer.

8. The method of claim 1, further comprising:
executing JAVA code referenced by the native application in one or more threads that execute asynchronously from the native application.

9. A system comprising:
a memory; and
a processor coupled to the memory;
wherein the processor is configured to:
detect that a native application executing on a computing device references a JAVA binding;
in response to detecting that the native application references the JAVA binding, determine whether a JAVA virtual machine is currently executing on the computing device;
in response to detecting that no JAVA virtual machine is currently executing on the computing device, create the JAVA virtual machine from a library that is embedded within the native application;
load a first set of classes on the computing device using a first class loader that is exclusive to the first set of classes and that is a child of a system class loader of the JAVA virtual machine;
load a second set of classes on the computing device using a second class loader that is exclusive to the second set of classes and that is a child of the system class loader of the JAVA virtual machine;
access, from the native application, objects instantiated from the first set of classes and objects instantiated from the second set of classes; and
evaluate, using a JAVA evaluator that is executed by the JAVA virtual machine and that is contained within a container created by the native application, a JAVA Unified Expression Language expression contained within a web page.

10. The system of claim 9, wherein the system is a mobile computing device, wherein the first and second sets of classes are sets of JAVA classes, and wherein the native application is not coded in JAVA.

11. The system of claim 9, wherein the processor is configured to:
promote a particular class from one of the first and second sets of classes to a project that contains classes that have system-wide scope;
wherein said promotion causes objects instantiated from said particular class to become accessible to objects instantiated from said first set of classes and objects instantiated from said second set of classes.

12. The system of claim 9, wherein the processor is configured to:
evaluate, using a JavaScript evaluator, an expression that refers to an object instantiated from a particular class from the first set of classes.

13. The system of claim 9, wherein the processor is configured to:
place, in a cache, results of said evaluating;
obtain said results from cache without involving said JAVA evaluator; and
evaluate the JAVA Unified Expression Language expression using a JavaScript evaluator that is also contained within the container created by the native application.

14. The system of claim 9, wherein the processor is configured to:
modify first data corresponding to the first object within a JavaScript layer in response to a data change event modifying a first object within a JAVA layer; and
modify a second object corresponding to the second data within the JAVA layer in response to a data change event modifying second data within the JavaScript layer.

15. A non-transitory computer-readable storage medium storing a plurality of instructions which, when executed by one or more processors, cause the one or more processors to perform steps comprising:
detecting that a native application executing on a computing device references a JAVA binding;
in response to detecting that the native application references the JAVA binding, determining whether a JAVA virtual machine is currently executing on the computing device;
in response to detecting that no JAVA virtual machine is currently executing on the computing device, creating the JAVA virtual machine from a library that is embedded within the native application;

loading a first set of classes on the computing device using a first class loader that is exclusive to the first set of classes and that is a child of a system class loader of the JAVA virtual machine; and loading a second set of classes on the computing device using a second class loader that is exclusive to the second set of classes and that is a child of the system class loader of the JAVA virtual machine;

accessing, from the native application, objects instantiated from the first set of classes and objects instantiated from the second set of classes; and evaluating, using a JAVA evaluator that is executed by the JAVA virtual machine and that is contained within a container created by the native application, a JAVA Unified Expression Language expression contained within a web page.

16. The non-transitory computer-readable storage medium of claim 15, wherein the computing device is a mobile computing device, wherein the first and second sets of classes are sets of JAVA classes, and wherein the native application is not coded in JAVA.

17. The non-transitory computer-readable storage medium of claim 15, wherein the steps further comprise:

promoting a particular class from one of the first and second sets of classes to a project that contains classes that have system-wide scope;

wherein said promotion causes objects instantiated from said particular class to become accessible to objects instantiated from said first set of classes and objects instantiated from said second set of classes.

18. The non-transitory computer-readable storage medium of claim 15, wherein the steps further comprise:

evaluating, using a JavaScript evaluator, an expression that refers to an object instantiated from a particular class from the first set of classes.

19. The non-transitory computer-readable storage medium of claim 15, wherein the steps further comprise:

caching, in a cache, results of said evaluating;

obtaining said results from cache without involving said JAVA evaluator; and evaluating the JAVA Unified Expression Language expression using a JavaScript evaluator that is also contained within the container created by the native application.

20. The non-transitory computer-readable storage medium of claim 15, wherein the steps further comprise:

in response to a data change event modifying a first object within a JAVA layer, modifying first data corresponding to the first object within a JavaScript layer; and in response to a data change event modifying second data within the JavaScript layer, modifying a second object corresponding to the second data within the JAVA layer.

* * * * *